US010885373B2

(12) United States Patent
Luo et al.

(10) Patent No.: US 10,885,373 B2
(45) Date of Patent: Jan. 5, 2021

(54) SYSTEMS AND METHODS FOR UNICODE HOMOGRAPH ANTI-SPOOFING USING OPTICAL CHARACTER RECOGNITION

(71) Applicant: Citrix Systems, Inc., Fort Lauderdale, FL (US)

(72) Inventors: Haipeng Luo, Nanjing (CN); Sai Xu, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 77 days.

(21) Appl. No.: 16/235,772

(22) Filed: Dec. 28, 2018

(65) Prior Publication Data

US 2020/0210745 A1    Jul. 2, 2020

(51) Int. Cl.
*G06K 9/46* (2006.01)
*H04L 29/06* (2006.01)

(52) U.S. Cl.
CPC ............ *G06K 9/46* (2013.01); *H04L 63/1483* (2013.01); *G06K 2209/01* (2013.01)

(58) Field of Classification Search
None
See application file for complete search history.

(56) References Cited

U.S. PATENT DOCUMENTS

| 10,679,088 | B1* | 6/2020 | Dalal | H04L 61/1511 |
| 2008/0172741 | A1* | 7/2008 | Reumann | H04L 63/1483 726/23 |
| 2012/0304295 | A1* | 11/2012 | Reumann | H04L 63/1441 726/22 |
| 2016/0342838 | A1* | 11/2016 | Shah | G06F 40/12 |
| 2017/0331855 | A1* | 11/2017 | Hardee | G06F 21/44 |
| 2019/0044967 | A1* | 2/2019 | Sukhomlinov | H04L 63/1483 |
| 2020/0134102 | A1* | 4/2020 | Yoneuchi | G06F 16/90344 |

FOREIGN PATENT DOCUMENTS

EP    2104901 A1    9/2009

OTHER PUBLICATIONS

Helfrich, et al: "Dual Canonicalization: An Answer to the Homograph Attack", Ecrime Researchers Summit (ECrime), 2012, IEEE, Oct. 23, 2012 (Oct. 23, 2012), pp. 1-10, XP 032351494, DOI: 10.1109/ecrime.2012.6489517, ISBN: 978-1-4673-2544-8, p. 1, col. 2, Line 33-Line 36.

* cited by examiner

*Primary Examiner* — Fayyaz Alam
(74) *Attorney, Agent, or Firm* — Fox Rothschild LLP; Robert J. Sacco; Carol E. Thorstad-Forsyth (57) ABSTRACT

Systems and methods for Optical Character Recognition ("OCR") based anti-spoofing for Unicode homograph. The method comprises: performing operations by a computing device to make an OCR identification on an original electronic address so as to obtain an OCR electronic address; encoding (a) the original electronic address to obtain an encoded access address and (b) the OCR electronic address to obtain an encoded OCR electronic address; comparing the encoded access address to the encoded OCR electronic address; and determining if a Unicode homograph spoofing situation exists based on results of the comparing.

20 Claims, 7 Drawing Sheets

SYSTEMS AND METHODS FOR UNICODE HOMOGRAPH ANTI-SPOOFING USING OPTICAL CHARACTER RECOGNITION

BACKGROUND

Statement of the Technical Field

The present disclosure relates generally to computing systems. More particularly, the present disclosure relates to implementing systems and methods for Unicode homograph anti-spoofing using Optical Character Recognition ("OCR").

Description of the Related Art

In a Unicode system, different characters may have identical appearances. For example, a Unicode character U+0430 a (Cyrillic Small Letter A), can have an identical appearance to a Unicode character U+0061 a (Latin Small Letter A). Cyrillic is, by far, the most commonly used alphabet for homograph, largely because it contains eleven lowercase glyphs that are identical or nearly identical to Latin counterparts. In this way, the following below listed web sites and/or email addresses are different even though they have the same appearance.
apple.com or aple@company.com

| | |
|---|---|
| a | Cyrillic Small Letter A U + 0430 |
| p | Cyrillic Small Letter Er U + 0440 |
| l | Cyrillic Small Letter Palochka U + 04CF |
| e | Cyrillic Small Letter le U + 0435 | apple.com or aple@company.com

| | |
|---|---|
| a | Latin Small Letter A U + 0061 |
| p | Latin Small Letter P U + 0070 |
| l | Latin Small Letter L U + 006C |
| e | Latin Small Letter E U + 0065 |

SUMMARY

The present disclosure concerns implementing systems and methods for OCR based anti-spoofing for Unicode homograph. The methods comprise: performing operations by a computing device to make an OCR identification on an original electronic address so as to obtain an OCR electronic address; encoding (a) the original electronic address to obtain an encoded access address and (b) the OCR electronic address to obtain an encoded OCR electronic address; comparing the encoded access address to the encoded OCR electronic address; and determining if a Unicode homograph spoofing situation exists based on results of the comparing. A determination is made that a Unicode homograph spoofing situation exists when the encoded access address is not equal to or does not match the encoded OCR electronic address. A warning or notification may be provided to the user of the computing device when a determination is made that the Unicode homograph spoofing situation exists.

In some scenarios, the original electronic address comprises an address (e.g., a Uniform Resource Locator ("URL") or an email address) that is allowed to contain at least one Unicode letter. The OCR identification is made by: capturing a screenshot including an image of data displayed on a display screen of the computing device; and processing the image to identify characters defining the original electronic address. The encoding is performed in accordance with an encoding technique that generates a string in pure ASCII form. The encoding technique includes, but is not limited to, plane Unicode encoding and/or Punycode encoding for URL.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The International Domain Name ("IDN") (RFC3490) makes it possible for a Unicode homograph attack, which means that one can fake URLs based on the fact that many different Unicode characters look alike. The browser should provide a mechanism to warn of such spoofing URLs. An existing browser based solution involves detecting an IDN URL by displaying the IDN URL as a Punycode encoded (RFC 3492) URL. If the IDN URL contains any possible homograph, the browser tries to provide warnings and/or notifications. A major drawback of this conventional solution is that it depends on an exhaustive method to go through all possible Unicode homograph sets in order to give warnings.

Email Address Internationalization ("EAI") is described in RFC 6530. EAI makes it possible for Unicode homograph deception (i.e., to fake a totally different email address based on the fact that many different Unicode characters look alike). An email client device should provide a mechanism to warn of such email address spoofing. An existing solution involves providing a client device that is able to detect an email address that contains a possible homograph and provide warnings and/or notifications. A major drawback of this conventional solution is that it also depends on an exhaustive method to go through all possible Unicode homograph sets in order to give warnings.

Shapes of characters vary greatly among fonts used to represent them. The Unicode standard uses representative glyphs in the code charts, but font designers are free to create their own glyphs. Creating fonts using an arbitrary glyph to represent any Unicode code point can lead to character confusion. For example, one could design a font where the 'a' looks like a 'b', 'c' like a 'd', and so on. One advantage of the present OCR-based solution described herein is eliminating the need to know the entire Unicode homograph character set (which can be difficult to collect).

In relation to URLs, the present solution solves the above stated drawbacks of conventional solutions by implementing the following operations in a web browser: making an OCR identification on an Original_URL (e.g., fake apple.com, in Cyrillic letters) to obtain an OCR_URL (e.g., real apple.com, in ASCII form); converting the OCR_URL from Unicode to ASCII, for example by Punycode encoding the OCR_URL to obtain a Punycode_OCR_URL (e.g., Punycode the ASCII apple.com still returns the ASCII apple.com); converting the Original_URL from Unicode to ASCII, for example by Punycode encoding the Original_URL to obtain a Punycode_Access_URL (e.g., xn—80ak6aa92e.com); and comparing the Punycode_Access_URL to Punycode_OCR_URL to determine if a Unicode homograph spoofing situation exists. A Unicode homograph spoofing situation is determined to exist when the Punycode_Access_URL is not equal to Punycode_OCR_URL. If it is determined that there is not Unicode homograph spoofing, then the Original_URL is considered relatively safe and the browsing is allowed to proceed. In contrast, if it is determined that there is Unicode homograph spoofing, then the Original_URL is considered relatively unsafe, a notification of the unsafe situation is provided and/or browsing is blocked.

In relation to email, the present solution solves the above stated drawbacks of conventional solutions by implementing the following operations in a computing device: making an OCR identification on an Original_Email (e.g., fake aple@company.com) to obtain an OCR_Email (e.g., aple@company.com); converting the OCR_Email from Unicode to ASCII, for example by generating a Unicode value string for the OCR_Email to obtain a Unicode_OCR_Email (e.g., 00610070006C0065 @company.com in ASCII form); converting the Original_Email from Unicode to ASCII, for example by generating a Unicode value string for the Original_Email (e.g., fake aple@company.com) to obtain A Unicode_Original_Email (e.g., 0430044004CF0435 @company.com); and compare the Unicode_Original_Email to the Unicode_OCR_Email to determine if a Unicode homograph spoofing situation exists. A Unicode homograph spoofing situation is determined to exist when the Unicode_Original_Email is not equal to Unicode_OCR_Email. If it is determined that there is not Unicode homograph spoofing, then the Original_Email is considered relatively safe and browsing is allowed. In contrast, if it is determined that there is Unicode homograph spoofing, then the Original_Email is considered relatively unsafe, a notification of the unsafe situation is provided, and/or browsing is blocked.

Figure 1:
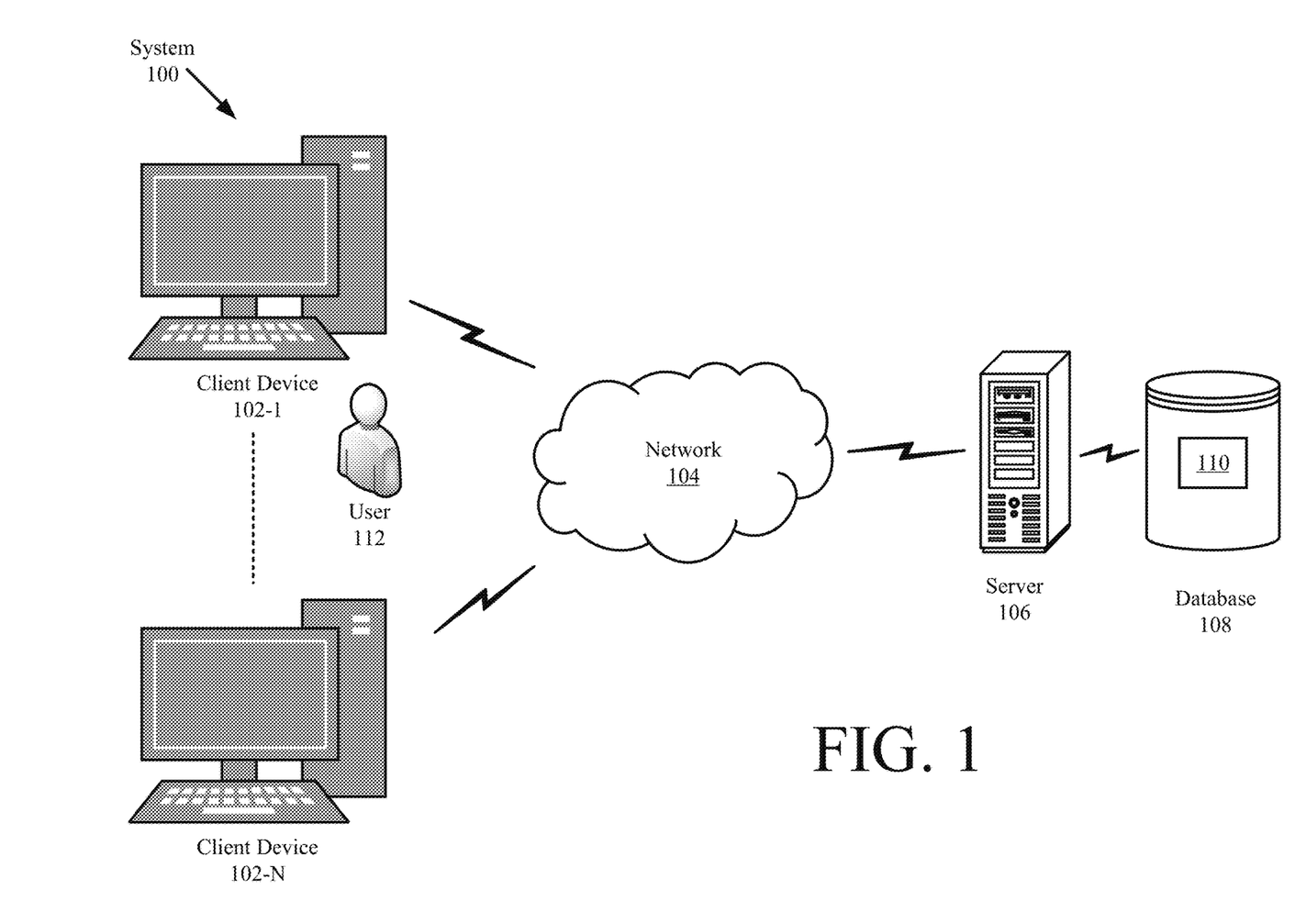
FIG. 1 is an illustration of an illustrative system.

Referring now to FIG. 1, there is provided an illustration of an illustrative system 100. System 100 comprises client devices 102-1, . . . , 102-N, a server 106 and a database 108. The client devices 102-1, . . . , 102-N include, but are not limited to, personal computers, desktop computers, laptop computers, smart devices, tablets, and/or personal digital assistants. The client devices 102-1, . . . , 102-N are communicatively coupled to each other and to the server 106 via a network 104 (e.g., the Internet). The client devices 102-1, . . . , 102-N may communicate with the server 106 at least for accessing web sites, web pages, email accounts, and/or other resources. In this regard, the client devices 102-1, . . . , 102-N execute web browsers (e.g., Internet Explorer available from Microsoft Corporation of Redmond, Wash.) and/or e-mail software programs (e.g., Outlook available from Microsoft Corporation of Redmond, Wash.). Web browsers and e-mail software programs are well known in the art, and therefore will not be described herein. Any known or to be known web browser and/or e-mail software program can be used herein without limitation. The server 106 is communicatively coupled with the database 108 which stores information 110 for one or more resources (e.g., web pages, virtualization platforms, email accounts, etc.).

Figure 2:
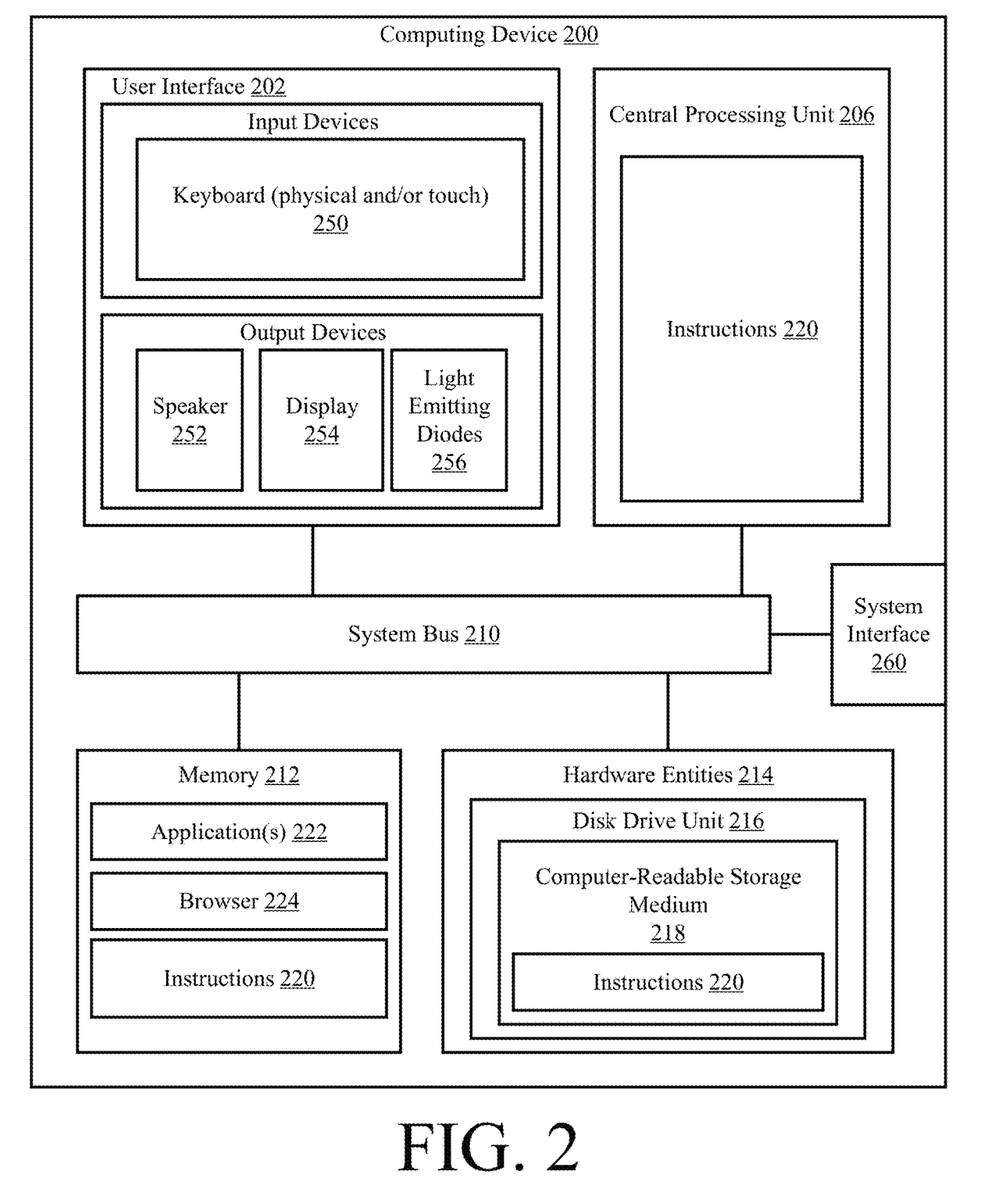
FIG. 2 is an illustration of an illustrative architecture for a computing device.

Referring now to FIG. 2, there is provided an illustration of an illustrative architecture for a computing device 200. Client devices 102 of FIG. 1 and/or server 106 of FIG. 1 is(are) the same as or similar to computing device 200. As such, the discussion of computing device 200 is sufficient for understanding these components of system 100.

In some scenarios, the present solution is used in a client-server architecture. Accordingly, the computing device architecture shown in FIG. 2 is sufficient for understanding the particulars of client computing devices and servers.

Computing device 200 may include more or less components than those shown in FIG. 2. However, the components shown are sufficient to disclose an illustrative solution implementing the present solution. The hardware architecture of FIG. 2 represents one implementation of a representative computing device configured to provide an improved item return process, as described herein. As such, the computing device 200 of FIG. 2 implements at least a portion of the method(s) described herein.

Some or all components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, a system interface 260, and hardware entities 214 connected to system bus 210. The user interface can include input devices and output devices, which facilitate user-software interactions for controlling operations of the computing device 200. The input devices include, but are not limited, a physical and/or touch keyboard 250. The input devices can be connected to the computing device 200 via a wired or wireless connection (e.g., a Bluetooth® connection). The output devices include, but are not limited to, a speaker 252, a display 254, and/or light emitting diodes 256. System interface 260 is configured to facilitate wired or wireless communications to and from external devices (e.g., network nodes such as access points, etc.).

At least some of the hardware entities 214 perform actions involving access to and use of memory 212, which can be a Radom Access Memory ("RAM"), a solid-state or disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

Computing device 200 implements methods for Unicode homograph anti-spoofing using OCR. In this regard, computing device 200 runs one or more software applications 222, 224 for facilitating electronic communications between two devices through a network (e.g., network 104) using electronic addresses (e.g., URLs and/or email addresses). The software applications 222 also facilitate analysis of electronic addresses to determine if a Unicode homograph spoofing situation exists (i.e., is an electronic address a fake address created by a malicious party). In this regard, the software applications 222 implement the methods discussed below in relation to FIGS. 3-9.

Figure 3:
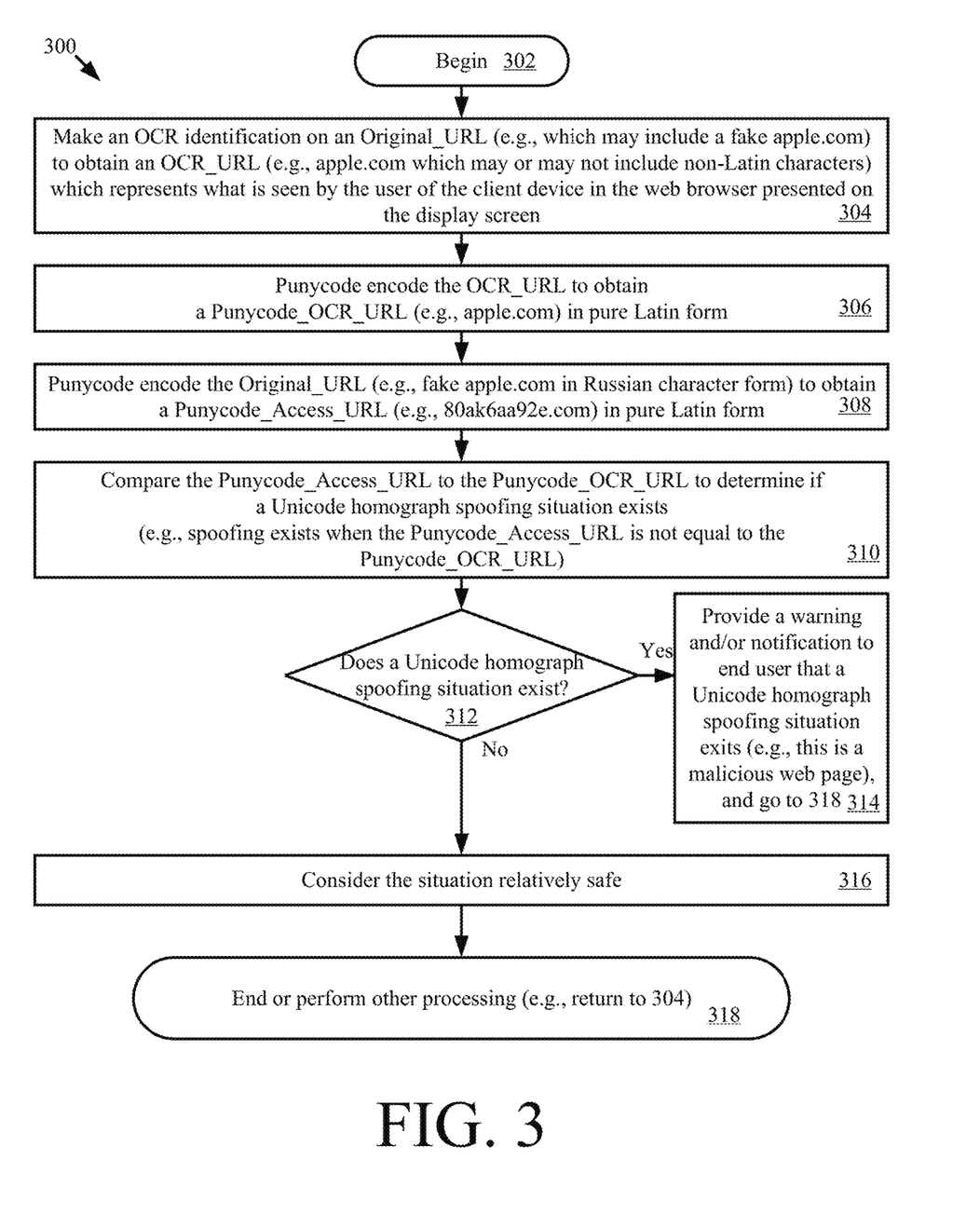
FIG. 3 is a flow diagram of an illustrative method for OCR based anti-spoofing for Unicode homograph.

Referring now to FIG. 3, there is provided a flow diagram of an illustrative method 300 for OCR based anti-spoofing for Unicode homograph in a browser context. Method 300 is performed by a computing device. The computing device can include, but is not limited to, client device 102-1, . . . , 102-N of FIG. 1, server 106 of FIG. 1, and/or computing device 200 of FIG. 2.

Method 300 comprises a plurality of operations 302-318. The present solution is not limited to the order of these operations 302-318 shown in FIG. 3. Operations 302-318 can be performed in any order selected for a particular application. For example, operation 308 may alternatively be performed prior to operation 304 and/or 306.

Method 300 begins with 302 and continues with 304 where an OCR identification is made on an Original_URL. The Original_URL may include a real URL or a fake URL (e.g., apple.com) in any language (e.g., English, Slavic, Belarisian, Bulgarian, Macedonian, Russian, Rusyn, Serbo-Croatian, Ukrainian, etc.). In some scenarios, the Original_URL is acquired from a message communicated to a client device (e.g., client device 102-1, . . . , 102-N of FIG. 1) from a server (e.g., server 106 of FIG. 1) for providing access to a web page, or from a hyperlink contained in a web page. The OCR identification is performed to obtain the URL that is seen by the user (e.g., user 112 of FIG. 1) of the client device (e.g., client device 102-1, . . . , 102-N of FIG. 1, or 200 of FIG. 2) in a browser (e.g., browser 224 of FIG. 2) presented on a display (e.g., display 254 of FIG. 2).

The OCR identification is made by: capturing a screenshot to obtain an image of data displayed on the display screen (e.g., display 254 of FIG. 2) of a client device (e.g., client device 102-1, . . . , 102-N of FIG. 1, or 200 of FIG. 2); and processing the image to identify the characters defining the Original_URL so as to obtain an OCR_URL (e.g., apple.com). Techniques for capturing screen shots and/or identify/extracting characters in/from images are well known in the art, and will not be described herein. Any known or to be known technique for capturing screen shots and/or extracting characters from images can be used herein without limitation. The OCR_URL may or may not include non-Latin characters (e.g., Cyrillic alphabet characters), and represents the URL seen by the user of the client device in the web browser presented thereto.

Next in 306, the OCR_URL is converted from Unicode to ASCII, for example by Punycode encoding the same to obtain a Punycode_OCR_URL (e.g., apple.com) in a pure ASCII form. Punycode encoding is well known in the art, and therefore will not be described herein. Any known or to be known Punycode encoding technique can be used herein without limitation. The Original_URL is also converted from Unicode to ASCII, for example by Punycode encoding the same in 308 to obtain a Punycode_Access_URL in a pure ASCII form (e.g, 80ak6aa92e.com).

In 310, the Punycode_Access_URL is compared to the Punycode_OCR_URL to determine if a Unicode homograph spoofing situation exists. A Unicode homograph spoofing situation is determined to exist when the Punycode_Access_URL does not equal or match the Punycode_OCR_URL. If a determination is made that a Unicode homograph spoofing situation does not exist [312:NO], then 316 is performed where the situation is considered safe. Subsequently, 318 is performed where method 300 ends or other processing is performed (e.g., return to 304).

If a determination is made that a Unicode homograph spoofing situation exists [312:YES], then 314 is performed where a warning and/or notification is provided to the user of the client device. The warning and/or notification can be provided through the browser or another window. The warning and/or notification can include information indicating that the web page is a malicious web page. Web browsing may also be blocked. After providing the warning and/or notification, method 300 goes to 318. In 318, method 300 ends or other processing is performed (e.g., return to 304).

Figure 4:
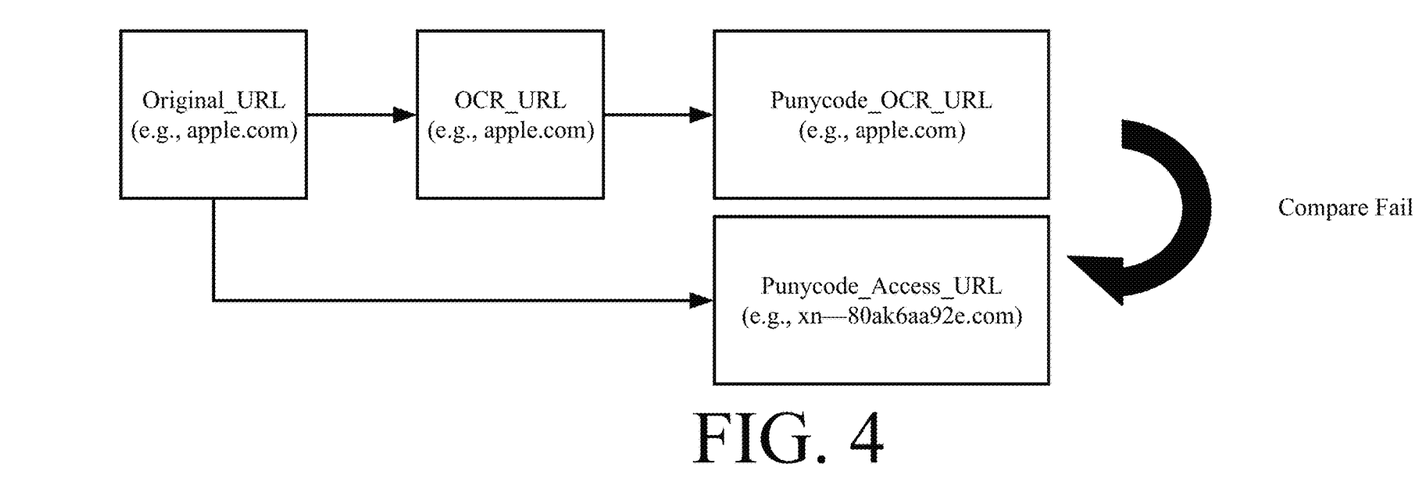
FIGS. 4-5 provide illustrations that are useful for further understanding the illustrative method of FIG. 3.
Figure 5:
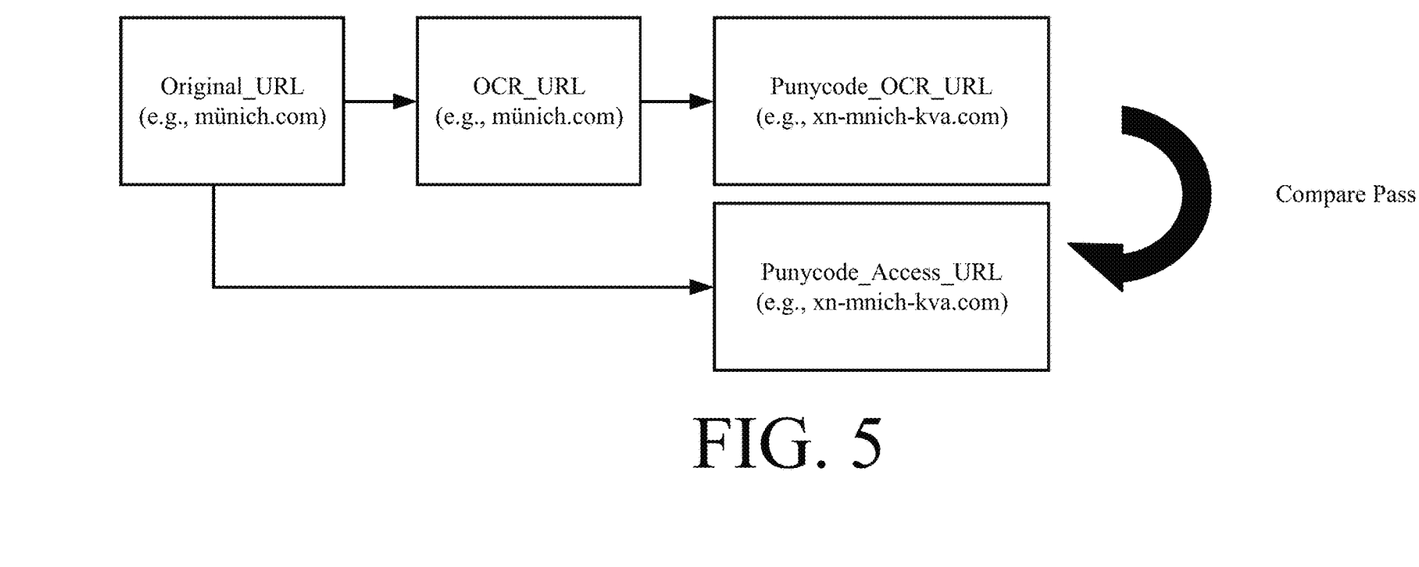

FIGS. 4-5 provide illustrations that are useful for further understanding method 300. As shown in the scenarios of FIG. 4, the comparison operations of 310 fail when the Punycode_OCR_URL does not equal or match the Punycode_Access_URL. As shown in FIG. 5, the comparison operations of 310 pass when the Punycode_OCR_URL does equal or match the Punycode_Access_URL.

Figure 6:
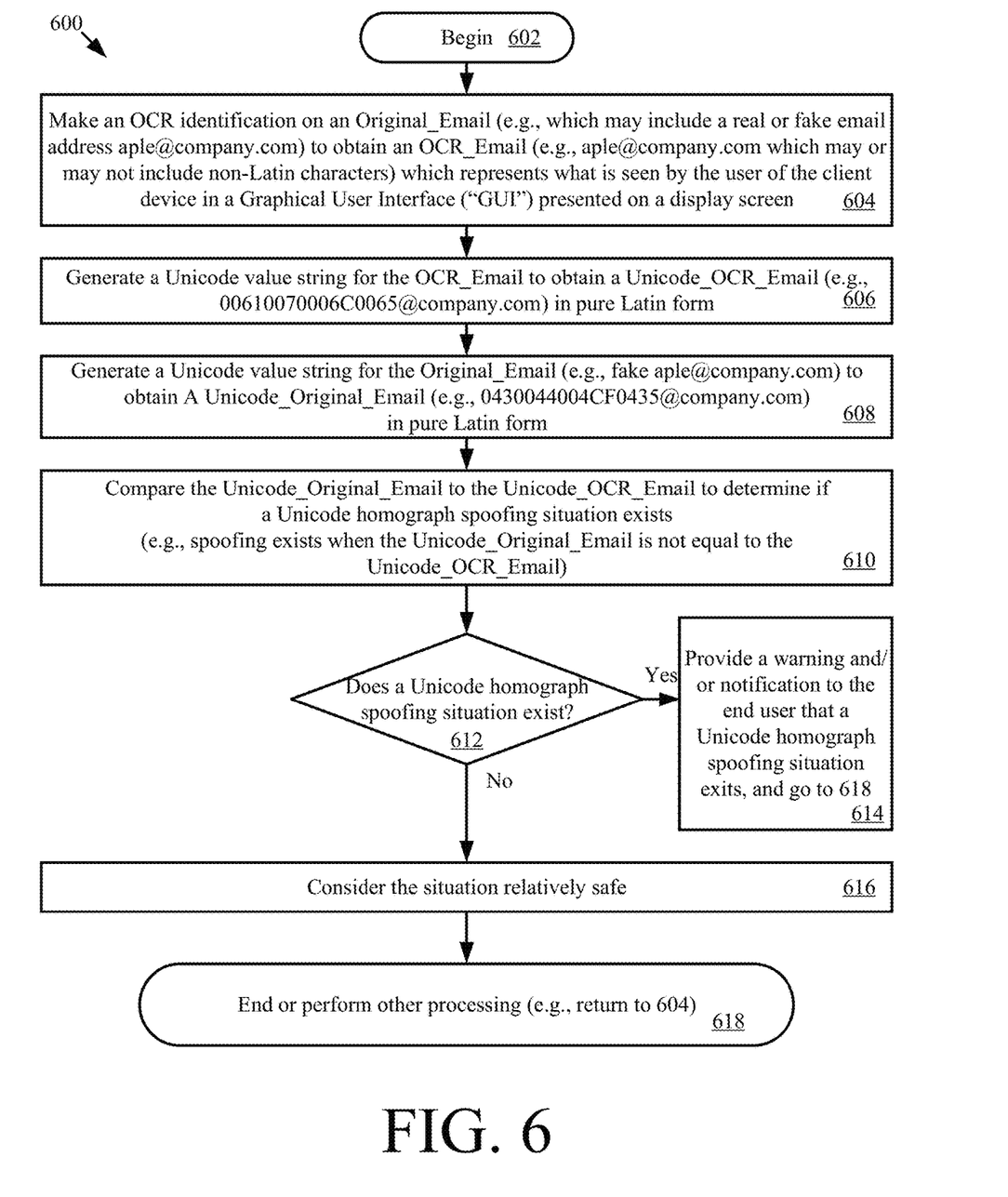
FIG. 6 is a flow diagram of another illustrative method for OCR based anti-spoofing for Unicode homograph.

As noted above, the present solution is not limited to URL based scenarios, and is also applicable to e-mail based scenarios. Referring now to FIG. 6, there is provided a flow diagram of an illustrative method 600 for OCR based anti-spoofing for Unicode homograph in an email context. Method 600 is performed by a computing device. The computing device can include, but is not limited to, client device 102-1, . . . , 102-N of FIG. 1, server 106 of FIG. 1, and/or computing device 200 of FIG. 2.

Method 600 comprises a plurality of operations 602-618. The present solution is not limited to the order of these operations 602-618 shown in FIG. 6. Operations 602-618 can be performed in any order selected for a particular application. For example, operation 608 may alternatively be performed prior to operation 604 and/or 606.

Method 600 begins with 602 and continues with 604 where an OCR identification is made on an Original_Email. The Original_Email may include a real email address or a fake email address (e.g., aple@company.com) in any language (e.g., English, Slavic, Belarisian, Bulgarian, Macedonian, Russian, Rusyn, Serbo-Croatian, Ukrainian, etc.). In some scenarios, the Original_Email is acquired from an electronic message communicated to a client device (e.g., client device 102-1, . . . , 102-N of FIG. 1) from a server (e.g., server 106 of FIG. 1) or from a first client device (e.g., client device 102-1 of FIG. 1) to a second client device (e.g., client device 102-N of FIG. 1). The OCR identification is performed to obtain the email address that is seen by the user (e.g., user 112 of FIG. 1) of the client device (e.g., client device 102-1, . . . , 102-N of FIG. 1, or 200 of FIG. 2) in a Graphical User Interface ("GUI") (e.g., a Microsoft Outlook Window) presented on a display (e.g., display 254 of FIG. 2).

The OCR identification is made by: capturing a screenshot to obtain an image of data displayed on the display screen (e.g., display 254 of FIG. 2) of a client device (e.g., client device 102-1, . . . , 102-N of FIG. 1, or 200 of FIG. 2); and processing the image to identify the characters defining the Original_Email so as to obtain an OCR_Email (e.g., an email address aple@company.com). Techniques for capturing screen shots and/or extracting characters from images are well known in the art, and will not be described herein. Any known or to be known technique for capturing screen shots and/or identify/extract characters in/from images can be used herein without limitation. The OCR_Email may or may not include non-Latin characters (e.g., Cyrillic alphabet characters), and represents the email address seen by the user of the client device in the web browser presented thereto.

Next in 606, a Unicode value string is generated for the OCR_Email to obtain a Unicode_OCR_Email (e.g., 00610070006C0065@company.com) in a pure ASCII form. Unicode encoding is well known in the art, and therefore will not be described herein. Any known or to be known Unicode encoding technique can be used herein without limitation. A Unicode value string for the Original_Email is also generated in 608 to obtain a Unicode_Access_Email in a pure ASCII form (e.g., 0430044004CF0435@company.com).

In 610, the Unicode_Access_Email is compared to the Unicode_OCR_Email to determine if a Unicode homograph spoofing situation exists. A Unicode homograph spoofing situation is determined to exist when the Unicode_Access_Email does not equal or match the Unicode_OCR_Email. If a determination is made that a Unicode homograph spoofing situation does not exist [612:NO], then 616 is performed where the situation is considered safe. Subsequently, 618 is performed where method 600 ends or other processing is performed (e.g., return to 604).

If a determination is made that a Unicode homograph spoofing situation exists [612:YES], then 614 is performed where a warning and/or notification is provided to the user of the client device. The warning and/or notification can be provided through the browser or another window. The warning and/or notification can include information indicating that the web page is a malicious web page. After providing the warning and/or notification, method 600 goes to 618. In 618, method 600 ends or other processing is performed (e.g., return to 604).

Figure 7:
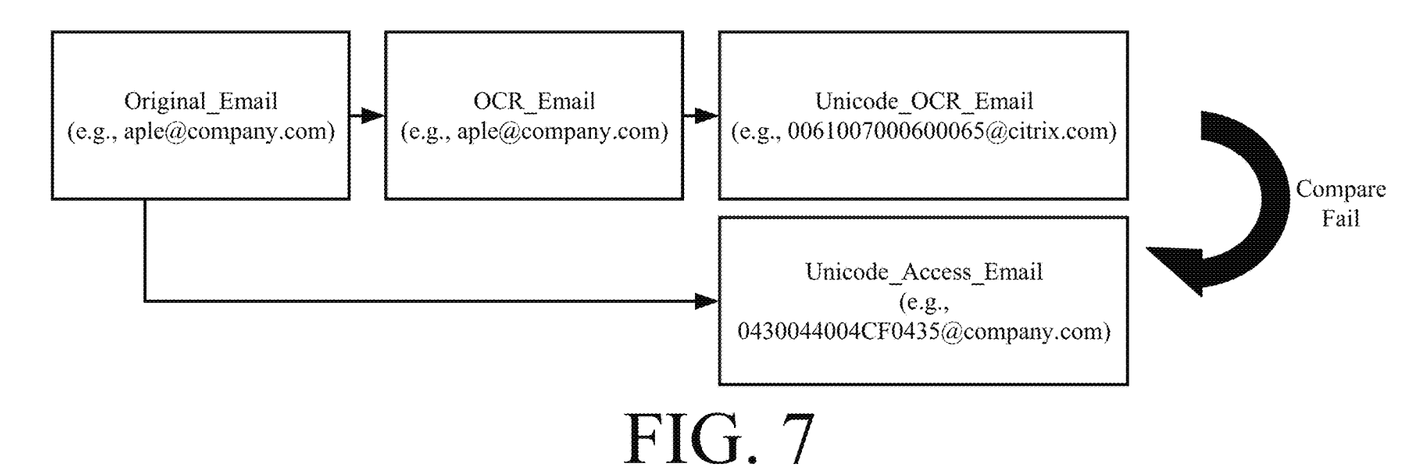
FIGS. 7-8 provide illustrations that are useful for further understanding the illustrative method of FIG. 6.
Figure 8:
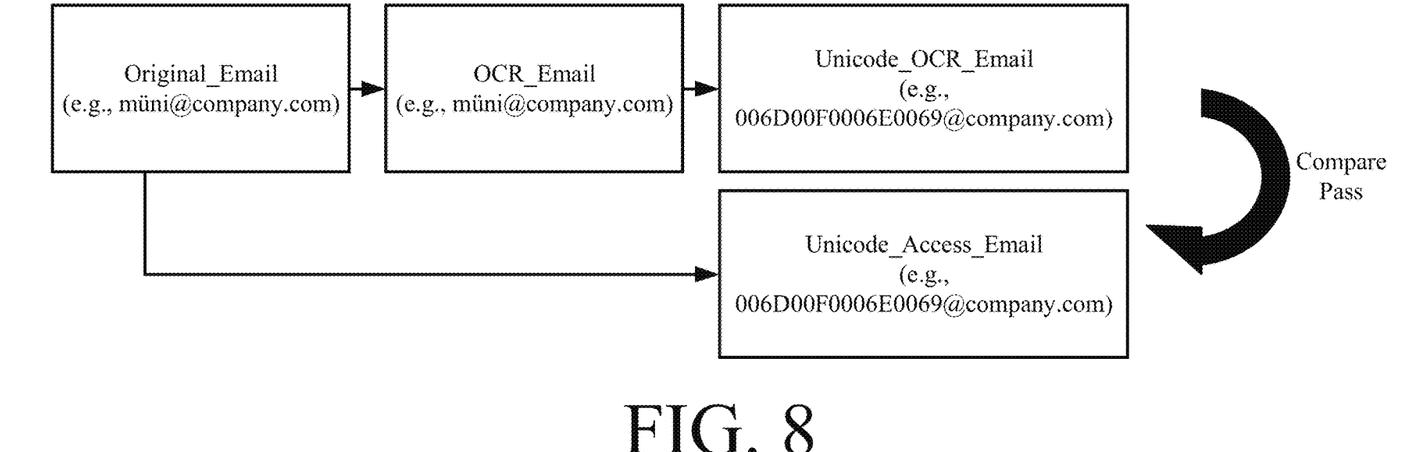

FIGS. 7-8 provide illustrations that are useful for further understanding method 600. As shown in the scenarios of FIG. 7, the comparison operations of 610 fail when the Unicode_OCR_Email does not equal or match the Unicode_Access_Email. As shown in FIG. 8, the comparison operations of 610 pass when the Unicode_OCR_Email does equal or match the Unicode_Access_Email.

Figure 9:
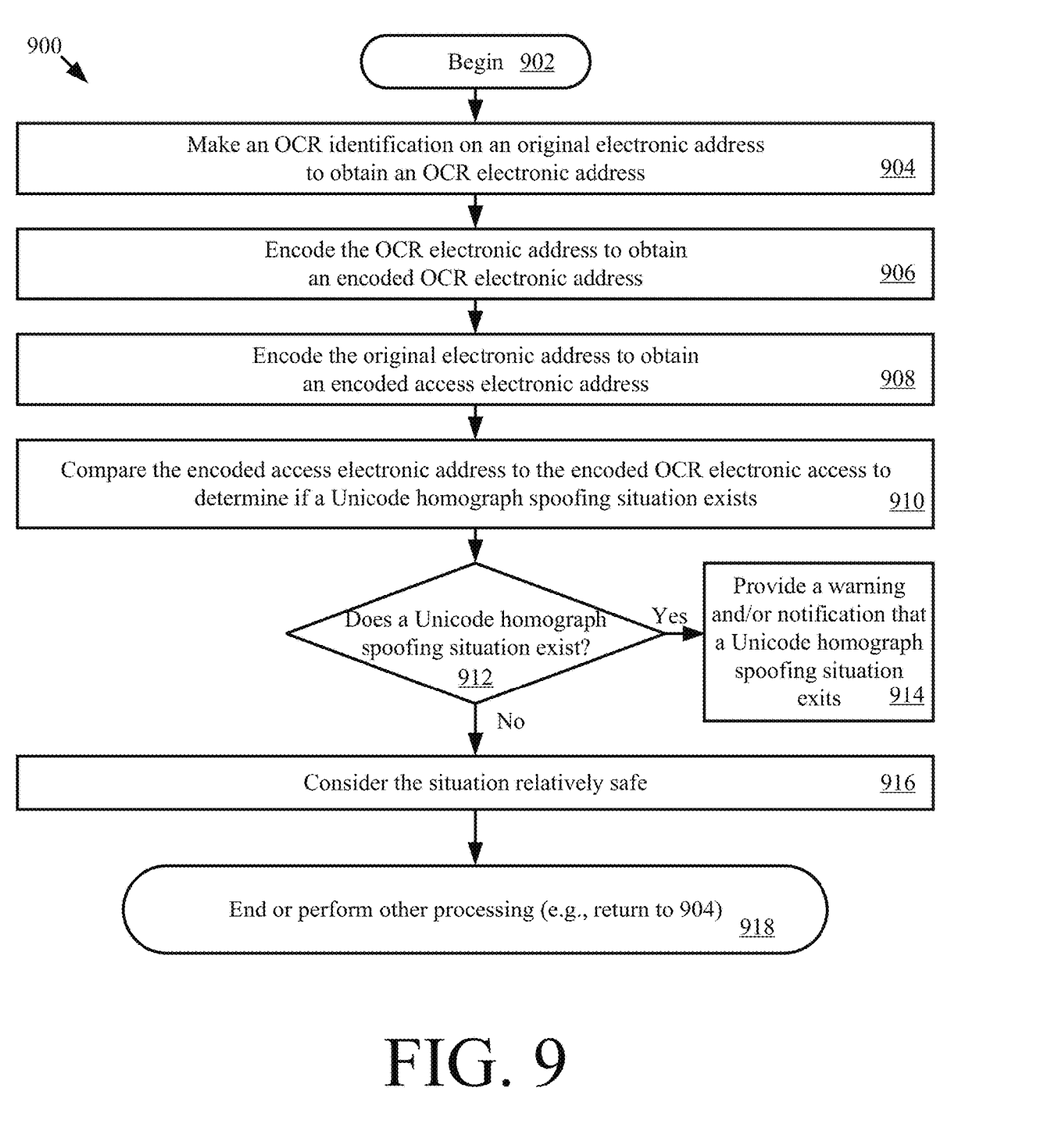
FIG. 9 is a flow diagram of an another illustrative method for OCR based anti-spoofing for Unicode homograph.

Referring now to FIG. 9, there is provided another method 900 for OCR based anti-spoofing for Unicode homograph. Method 900 is performed by a computing device. The computing device can include, but is not limited to, client device 102-1, . . . , 102-N of FIG. 1, server 106 of FIG. 1, and/or computing device 200 of FIG. 2.

Method 900 comprises a plurality of operations 902-918. The present solution is not limited to the order of these operations 902-918 shown in FIG. 9. Operations 902-918 can be performed in any order selected for a particular application. For example, operation 908 may alternatively be performed prior to operation 904 and/or 906.

Method 900 begins with 902 and continues with 904 where an OCR identification is made on an original electronic address. The original electronic address can include, but is not limited to, a URL, an email address or any other address allowed to contain at least one Unicode letter. The original electronic address may include a real electronic address or a fake electronic address in any language (e.g., English, Slavic, Belarisian, Bulgarian, Macedonian, Russian, Rusyn, Serbo-Croatian, Ukrainian, etc.). The OCR identification is performed to obtain the electronic address that is seen by the user (e.g., user 112 of FIG. 1) of the client device (e.g., client device 102-1, . . . , 102-N of FIG. 1, or 200 of FIG. 2) presented on a display (e.g., display 254 of FIG. 2).

The OCR identification is made by: capturing a screenshot to obtain an image of data displayed on the display screen (e.g., display 254 of FIG. 2) of a client device (e.g., client device 102-1, . . . , 102-N of FIG. 1, or 200 of FIG. 2); and processing the image to identify the characters defining the original electronic address so as to obtain an OCR electronic address. Techniques for capturing screen shots and/or extracting characters from images are well known in the art, and will not be described herein. Any known or to be known technique for capturing screen shots and/or identify/extract characters in/from images can be used herein without limitation. The OCR electronic address may or may not include non-Latin characters (e.g., Cyrillic alphabet characters), and represents the electronic address seen by the user of the client device.

Next in 906, the OCR electronic address is encoded to obtain an encoded OCR electronic address. The encoding is achieved using an encoding technique that generates a string of characters in pure ASCII form. Such encoding techniques are known in the art, and therefore will not be described herein. Any similar encoding technique can be used herein without limitation. For example, a Unicode or a Punycode encoding technique is employed here. The original electronic address is also encoded in 908 to obtain an encoded access electronic address in a pure ASCII form. The same or different encoding technique can be used in 906 and 908.

In 910, the encoded access electronic address is compared to the encoded OCR electronic address to determine if a Unicode homograph spoofing situation exists. A Unicode homograph spoofing situation is determined to exist when the encoded access electronic address does not equal or match the encoded OCR electronic address. If the a determination is made that a Unicode homograph spoofing situation does not exist [912:NO], then 916 is performed where the situation is considered safe. Subsequently, 918 is performed where method 900 ends or other processing is performed (e.g., return to 904).

If a determination is made that a Unicode homograph spoofing situation exists [912:YES], then 914 is performed where a warning and/or notification is provided to the user of the client device. The warning and/or notification can be provided through the browser or another window. The warning and/or notification can include information indicating that the web page is a malicious web page. After providing the warning and/or notification, method 900 goes to 918. In 918, method 900 ends or other processing is performed (e.g., return to 904).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for Optical Character Recognition ("OCR") based anti-spoofing for Unicode homograph, comprising:
    performing operations by a computing device to make an OCR identification on an original electronic address so as to obtain an OCR electronic address;
    encoding (a) the original electronic address to obtain an encoded access address and (b) the OCR electronic address to obtain an encoded OCR electronic address;
    comparing the encoded access address to the encoded OCR electronic address; and
    determining if a Unicode homograph spoofing situation exists based on results of the comparing.

2. The method according to claim 1, wherein the original electronic address comprises an address that is allowed to contain at least one Unicode letter.

3. The method according to claim 2, wherein the address comprises a Uniform Resource Locator ("URL").

4. The method according to claim 2, wherein the address comprises an email address.

5. The method according to claim 1, wherein the OCR identification is made by:
    capturing a screenshot including an image of data displayed on a display screen of the computing device; and
    processing the image to identify characters defining the original electronic address.

6. The method according to claim 1, wherein the encoding is performed in accordance with an encoding technique that generates a string in pure ASCII form.

7. The method according to claim 6, wherein the encoding technique comprises Unicode encoding.

8. The method according to claim 6, wherein the encoding technique comprises Punycode encoding.

9. The method according to claim 1, wherein a determination is made that a Unicode homograph spoofing situation exist when the encoded access address is not equal to or does not match the encoded OCR electronic address.

10. The method according to claim 1, further comprising providing a warning or notification to the user of the computing device when a determination is made that the Unicode homograph spoofing situation exists.

11. A system, comprising:
    a processor;
    a non-transitory computer-readable storage medium comprising programming instructions that are configured to cause the processor to implement a method for Optical Character Recognition ("OCR") based anti-spoofing for Unicode homograph, wherein the programming instructions comprise instructions to:
    make an OCR identification on an original electronic address so as to obtain an OCR electronic address;
    encode (a) the original electronic address to obtain an encoded access address and (b) the OCR electronic address to obtain an encoded OCR electronic address;
    compare the encoded access address to the encoded OCR electronic address; and
    determine if a Unicode homograph spoofing situation exists based on results of the comparing.

12. The system according to claim 11, wherein the original electronic address comprises an address that is allowed to contain at least one Unicode letter.

13. The system according to claim 12, wherein the address comprises a Uniform Resource Locator ("URL").

14. The system according to claim 12, wherein the address comprises an email address.

15. The system according to claim 11, wherein the OCR identification is made by:
    capturing a screenshot including an image of data displayed on a display screen of the computing device; and processing the image to identify characters defining the original electronic address.

16. The system according to claim 11, wherein the encoding is performed in accordance with an encoding technique that generates a string in pure ASCII form.

17. The system according to claim 16, wherein the encoding technique comprises Unicode encoding.

18. The system according to claim 16, wherein the encoding technique comprises Punycode encoding.

19. The system according to claim 11, wherein a determination is made that a Unicode homograph spoofing situation exist when the encoded access address is not equal to or does not match the encoded OCR electronic address.

20. The system according to claim 11, wherein the programming instructions further comprise instructions to provide a warning or notification to the user of the computing device when a determination is made that the Unicode homograph spoofing situation exists.

* * * * *